UNITED STATES PATENT OFFICE 2,026,542

FREE CUTTING ALLOYS

Louis W. Kempf and Walter A. Dean, Cleveland, Ohio, assignors to Aluminum Company of America, Pittsburgh, Pa., a corporation of Pennsylvania No Drawing. Application September 18, 1933, Serial No. 689,880

3 Claims. (Cl. 75—1)

This invention relates to aluminum base alloys and it is particularly concerned with those alloys containing silicon as a major alloy component.

Aluminum base alloys containing from about 3 to 15 per cent of silicon have been widely used in cast, extruded and wrought forms because of such desirable casting characteristics as fluidity and low solidification shrinkage of the molten alloy, combined with a good workability of the solid metal if a wrought article is to be made. The alloys also possess a low coefficient of thermal expansion and satisfactory physical properties, particularly the tensile strength and elongation. In spite of these advantageous properties, the field of utility of these alloys has been restricted because of their inherently poor machining quality and consequent increased cost of finishing articles of these alloys by machining operations such as boring, drilling, shaping, planing, or lathe-cutting. Difficulty in machining is made evident through an excessive cutting tool wear which necessitates a frequent resharpening. Poor machinability is also manifested in a rough irregular machined surface and the tendency to form long chips that may foul the cutting tool or operating parts of the machine. Aluminum-silicon alloys are furthermore quite likely to have hard particles of elementary silicon distributed throughout the alloy matrix which seriously interfere with smooth cutting of the article being machined. These difficulties are most readily apparent in machining operations conducted on a large scale such as the manufacture of pistons for internal combustion engines where it has been found desirable to use an expensive cutting tool material to insure long tool life and a satisfactory machined surface.

It is accordingly one of the objects of our invention to make aluminuum-silicon alloys amenable to machining operations on a large scale without encountering the disadvantages hereinbefore referred to. A specific purpose is to diminish the irregularity in cut caused by the hard silicon particles and to produce a smooth pleasing surface on the machined article. A further object is to accomplish the forego'ng ends without disadvantageously affecting the physical properties of the alloy.

Our invention is predicated upon the discovery that the addition of lead and/or thallium to aluminum-silicon alloys containing from about 3 to 15 per cent silicon greatly improves the machining quality of this type of aluminum alloy. The improvement is especially marked in those alloys containing from about 10 to 15 per cent of silicon which have heretofore been particularly difficult to machine. We have found that the addition of from about 0.05 to 10 per cent of lead and/or thallium to aluminum-silicon alloys imparts a machinability to the alloy which renders it adaptable to all ordinary machining requirements. For the purpose of our invention, lead and thallium are substantially equivalent and are considered to constitute a class of elements with respect to their effect upon the machining quality of aluminum-silicon alloys.

The improvement in machining characteristics referred to above may be brought about by the addition of between about 0.05 and 10 per cent of lead or thallium to aluminum base alloys containing from about 3 to 15 per cent silicon, but for many applications we prefer to use between about 1 and 5 per cent of either lead or thallium. The effect on machinability of these added elements is manifested by the smooth flow of chips from the article being machined, the short breakable chips that are produced, the absence of galling or unevenness of cut, resulting in an irregular surface of dull appearance, and the increase in cutting speed which is possible under such favorable conditions. As an example of an alloy possessing these properties the following composition may be cited: 12 per cent silicon, 4 per cent lead, balance substantially all aluminum.

Lead and thallium may not only be successfully used in binary aluminum-silicon alloys, but also in alloys containing copper, magnesium, manganese and the like in addition to the silicon. The action of lead and thallium in improving the machinability of such alloys appears to be substantially independent of the other alloying ingredients added to alter the character of the basic aluminum-silicon alloy. As an illustration of the benefit derived from the use of lead or thallium in alloys of this nature, the case of an alloy used in the manufacture of pistons for internal combustion engines may be cited. An alloy containing about 12.5 per cent of silicon, 1 per cent of magnesium, 0.8 per cent of nickel, and 0.8 per cent of copper, balance aluminum, had greatly improved machining quality after the addition of about 3 per cent of lead as compared to the same alloy containing no lead. Another example of the beneficial effect of lead on the machining characteristics of aluminum-silicon base alloys is found in an alloy containing about 5 per cent silicon, 0.7 per cent copper, and 0.3 per cent magnesium, the balance being aluminum.

This alloy in cast form may be used for making cylinder heads for certain types of internal combustion engines. It is desirable that such a casting be readily machinable without diminishing the strength at ordinary or elevated temperatures. We have found that the addition of about 2.25 per cent of lead produces a marked improvement in machining quality without impairing any of the other desired properties of the alloy.

Lead and thallium may not only be used separately in alloys of the type herein disclosed, but they may be effectively employed in combination in certain applications. The two elements frequently co-act in an aluminum-silicon alloy to produce a degree of machinability not attained by an equivalent amount of either element alone. When so used in combination the total amount should not exceed 10 per cent and preferably less than 5 per cent is recommended. The relative proportions of the two elements may be varied but approximately equal amounts of them generally give satisfactory results.

For certain applications it has been found desirable to add other elements than lead and thallium which also serve to improve the machining quality of the alloy. The elements cadmium and bismuth belong to this class of substances and may advantageously be combined with lead and/or thallium. When so used, the metals cadmium and bismuth should be added in quantities of between about 1.5 and 6 per cent separately or in combination, the total amount in no case exceeding about 6 per cent. An alloy of this type which has been found to have a satisfactory machining quality is one containing about 12 per cent of silicon, 2 per cent of lead, and 2 per cent of cadmium, the balance being substantially all aluminum.

The tensile properties of the alloys herein described are not materially affected by the addition of lead and/or thallium in amounts of less than 5 per cent but there is a decline in strength if larger quantities are added. However, the machinability of the alloy is somewhat better in such cases which compensates in part for any loss in strength. The tensile properties are likewise affected if both elements are present and the total amount of lead and thallium exceeds about 5 per cent.

The lead and thallium may be most conveniently added to the molten aluminum-silicon alloy in solid metallic form. Other methods of making alloy additions practiced by those skilled in the art yield equally satisfactory results. If the amount of lead and thallium to be added exceeds about 1.5 per cent, the melt should be heated somewhat above ordinary temperatures and vigorously stirred to assure a uniform mixture. The method of adding lead and thallium to aluminum and its alloys here referred to is more fully described in our copending application Serial No. 689,885, filed September 18, 1933. Alloys disclosed herein but not claimed are claimed in our copending applications Serial Nos. 19,607, 19,608, 19,609, 19,610, 19,611, 19,612, 19,613, 19,614, 19,615, and 19,616, filed May 3, 1935.

The term "aluminum" used herein and in the appended claims embraces the usual impurities found in aluminum ingot of commercial grade, or picked up in the course of the usual handling operations incident to ordinary melting practice.

The alloys herein disclosed may be subjected to the usual thermal treatments familiar to those skilled in the art for the purpose of improving or altering their physical characteristics.

We claim:

1. An aluminum base alloy containing about 12 per cent of silicon, and about 4 per cent of lead, the balance being aluminum.

2. An aluminum base alloy containing from about 3 to 15 per cent of silicon and from about 0.05 to 10 per cent of lead, the balance being aluminum.

3. An aluminum base alloy containing from about 3 to 15 per cent of silicon and from about 1 to 5 per cent of lead, the balance being aluminum.

LOUIS W. KEMPF.
WALTER A. DEAN.